United States Patent [19]

Weierman et al.

[11] 4,232,622

[45] Nov. 11, 1980

[54] METHOD OF MAKING A CONTAINER CLOSURE

[75] Inventors: Robert J. Weierman, Lockport; Joseph J. Merle, Oak Lawn; Gerald A. Gordon, Skokie; Peter N. Y. Pan, Country Club Hills; Rafael J. Hernandez, Chicago, all of Ill.

[73] Assignee: The Continental Group, Inc., Stamford, Conn.

[21] Appl. No.: 5,755

[22] Filed: Jan. 23, 1979

Related U.S. Application Data

[62] Division of Ser. No. 950,483, Oct. 11, 1978, Pat. No. 4,170,314.

[51] Int. Cl.³ .............................................. B21D 51/46
[52] U.S. Cl. .................................... 113/121 C; 156/69
[58] Field of Search ...................... 113/121 C; 156/69; 220/260, 269, 270, 359

[56] References Cited

U.S. PATENT DOCUMENTS

| | | | |
|---|---|---|---|
| 3,671,356 | 6/1972 | Keinanen | 156/69 X |
| 3,990,603 | 11/1976 | Brochman | 220/260 |
| 4,004,530 | 1/1977 | Walter | 113/121 C |
| 4,164,303 | 8/1979 | Waterbury | 220/260 |

*Primary Examiner*—Milton S. Mehr
*Attorney, Agent, or Firm*—John J. Kowalik; Joseph E. Kerwin; Charles E. Brown

[57] ABSTRACT

A closure for a container wherein a tape having a metal part and thermoplastic material which is applied to the container wall and heated. Most of the material is squeezed out from between the metal part and the wall into a rib which is formed during application. The material in the rib has an isotropic structural characteristic since the rib formation provides a region into which the excess material is directed minimizing the shearing effect of the flow of material along the interface with the container wall. Also the rib reinforces the tape in the critical region to resist pressure of gasses in the container when used to contain carbonated beverages. This patent covers a method of making the above described closure.

7 Claims, 5 Drawing Figures

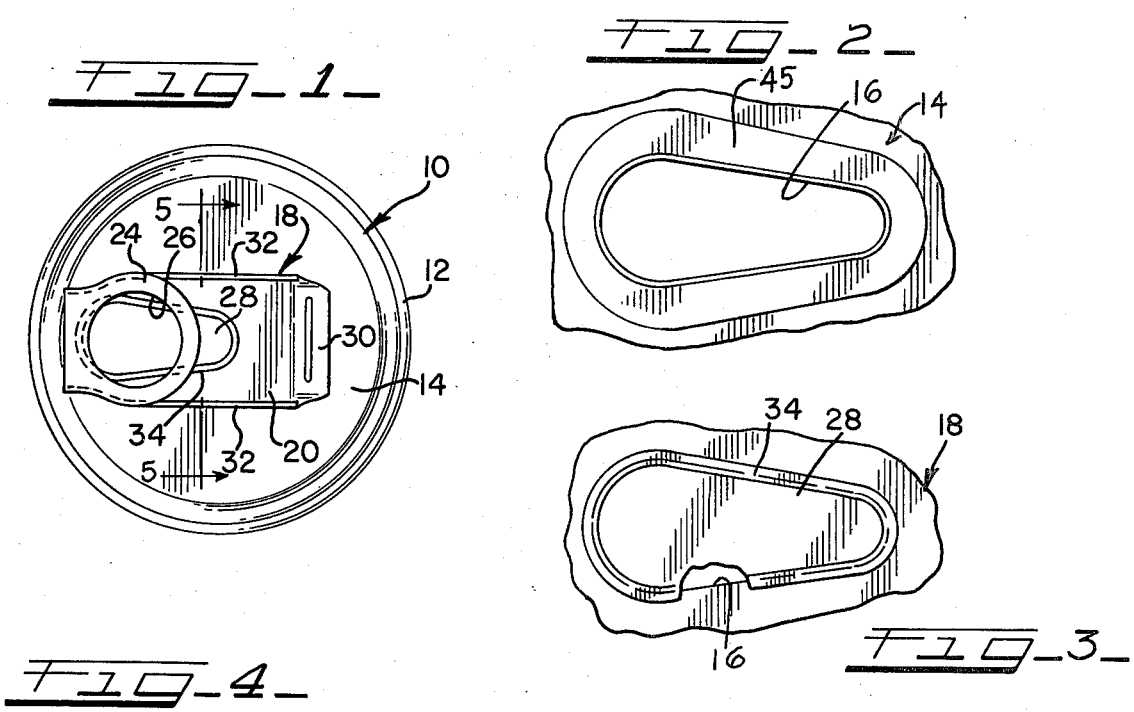
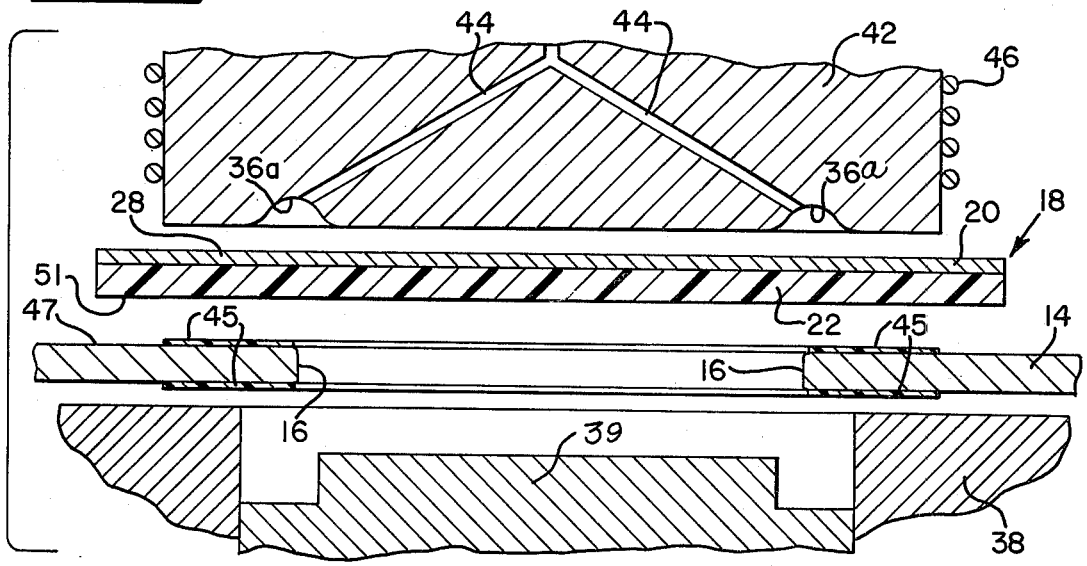
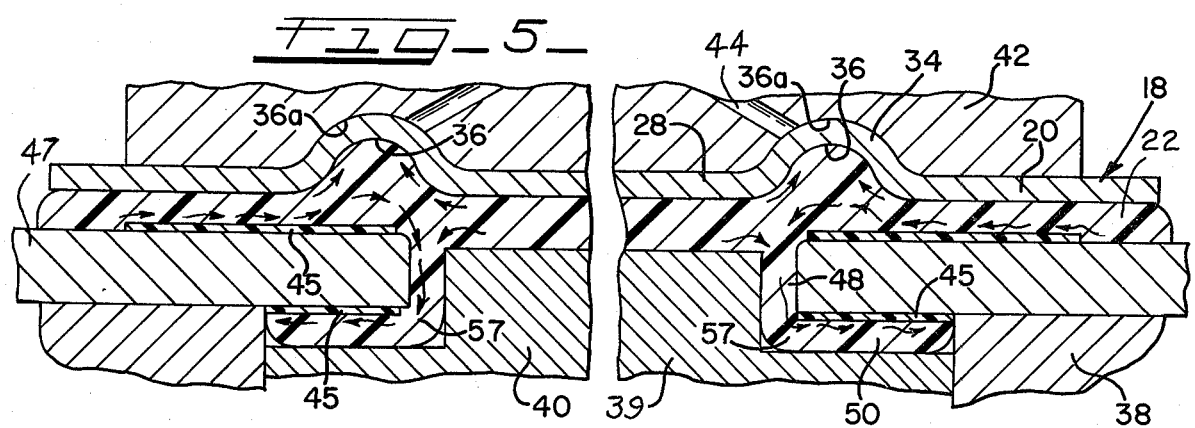

METHOD OF MAKING A CONTAINER CLOSURE

This is a division of Ser. No. 950,483, filed Oct. 11, 1978, now U.S. Pat. No. 4,170,314.

DISCUSSION OF THE PRIOR ART

Attempts have been made heretofore with various degrees of success of providing a simple and yet effective tape seal for pressurized beverage containers. Successful applications have been made by utilizing multiple holes, or by applying a tape to both the interior and exterior sides of the container wall to seal the pour opening or the sealing material was caused to flow into the opening and under the wall. The difficulties experienced have been primarily in not being able to entirely eliminate leakers in high speed volume production and in the excessive cost for equipment or in customer's resistance to accept the product.

SUMMARY OF THE INVENTION

This invention relates in general to new and useful improvements in easy opening containers, and more particularly to an easy opening container having a preformed dispensing opening therein which is normally closed by a pull tab which has a plastics material layer opposing the container panel and bonded thereto.

This invention is directed primarily to a single hole pour opening for high pressure beverage and more specifically to a novel closure in which the flow of the thermoplastic material, which in being adhered to the end panel of the container, is controlled to inhibit or essentially eliminate shear stresses at the interface between the end panel and the plastic so as to improve the adhesion therebetween.

In accordance with this invention, it is proposed to provide a pull tab which is of a laminated construction and has an inner layer formed of heat bondable plastics material which, when the tab is applied under pressure and heated conditions, will in part flow through the preformed dispensing opening in the container panel and then outwardly along the opposite surface to define a protective flange.

Most particularly, this invention has to do with the formation of the tab and the anvil utilized in applying the tab. First of all since the anvil must have the tab accurately positioned thereon for application to the container panel, the anvil is provided with a vacuum groove within which a vacuum is drawn. In accordance with this invention, the tab is provided with an upstanding rib on the surface thereof remote from the layer of plastics material, the rib being formed at time of application to the end panel and configured to fit tightly within the vacuum groove. This not only provides for accurate positioning of the tab relative to the anvil, but also provides for an intimate contacting of the tab with the anvil to effect heating of the plastics material of the tab to a temperature where it is readily flowable under pressure and is self-bondable to the container panel.

In accordance with this invention, the rib of the tab has an outline corresponding generally to but of a greater size than the dispensing opening in the container panel so that the rib circumscribes the dispensing opening and is closely adjacent thereto.

The formation of the rib on the tab results in the formation of a groove in the opposite surface of the outer layer of the tap into which the plastics material flows to provide an increased volume of the plastics material around the dispensing opening. The increased volume of the plastics material provides a minimum flow area around the dispensing opening, thus providing an improved bond in that research has shown improved bonds are obtained in areas of minimum plastics flow.

Finally, the groove in the outer layer of the tab reduces the probability of "feathering" of the plastics material around the dispensing opening, feathering occurring when the plastics material breaks at its interface with the outer layer of the tab instead of breaking along the flange on the inside of the dispensing opening. The added material aligned with the rib of the tab provides sufficient plastics material to assure the desired break along the inside flange of the dispensing opening.

A more specific object of the invention is to provide a novel tab construction formed in situ during application of the tape to the container wall wherein the tape is shaped to draw the excess plastic material away from the container wall in the vicinity of the pour opening as the material is being compressed and squeezed out from between the container and the tape and thereby to produce generally isotropic structural characteristics and to essentially prevent the development of shearing stresses at the interface with the container wall and thus improve the bond.

The invention comprehends a novel process for applying the tape to the container wall in which the tape or wall and/or both are heated and the tape is squeezed against the wall and simultaneously a vacuum is applied against the exterior of the tape drawing a limited section of the tape away from the container wall in order to form a rib which encompasses the pour aperture in the end wall, the rib strengthening the tape in a critical area and the distortion of the tape in forming the rib changing the structural characteristics of the plastic in this region and thereby improving its capabilities to resist flexing and improving the blowout resistance of the tape.

A broad object is to provide a novel tape closure in which the tape including the sealing material is reformed during application to a container wall in closing relation to a pour aperture therein and the flow of plastic is controlled so as not to starve the critical area about the hole of the sealing material.

IN THE DRAWINGS

FIG. 1 is a plan view of the novel end unit;

FIG. 2 is an enlarged top plan view of a portion of the shell;

FIG. 3 is a plan view with parts broken away;

FIG. 4 is a schematic sectional view showing the tab being applied to the shell;

FIG. 5 is an enlarged transverse sectional view showing the tab in applied position taken generally on line 5—5 of FIG. 1.

DESCRIPTION OF THE INVENTION

Referring now to the Figures of the drawings, it will be seen that there is illustrated a conventional end unit shell 10 forming an end of a container. The shell 10 may be of varying cross section, but does have a peripheral seam forming portion 12 defining an end panel 14 in which a dispensing opening 16 of a selected configuration is formed. The dispensing opening 16 is elongated and is of an increasing width, and extends generally radially outwardly from the center of the shell 10.

There is illustrated a pull tab 18 particularly adapted to be bonded to the shell 10 for sealing the opening 16 therein against leakage and internal pressures. The pull tab 18 is of a conventional tape type formed of a laminate including an outer metal foil layer 20 preferably dead soft aluminum and an inner plastics material layer 22, preferably polypropylene, as is best shown in FIG. 4. The tab 18 includes a grip portion 24 which may have a finger receiving opening 26 formed therein. The tab 18 also includes a sealing portion 28 which directly overlies the container panel 14 and terminates in an end portion 30 which normally will be permanently bonded to the shell 10 by utilizing a special adhesive as disclosed in U.S. Pat. No. 3,990,615.

As is clearly illustrated in FIG. 1, the sealing portion of the tab is reinforced by the metal foil layer 20 having the side edges thereof reversely folded to define hems 32. The plastics material layer 22 may be of a width less than the hem reinforced metal foil layer 20.

Further, the sealing portion 28 has formed in the metal foil outer layer 20 an upstanding rib 34 which, in turn, defines an internal groove 36 FIG. 5 which is filled with the plastics material of the layer 22. The rib is of an outline corresponding to the outline of the dispensing opening 16 but of a greater size so as to surround the dispensing opening 16 and being alignable with material of the container panel 14 outwardly of the dispensing opening 16.

In accordance with this invention, the shell 10 is carried by a suitable support 38 which, as is best shown in FIG. 5, has a punch or plug 39 configured to effect a limited molding of the plastics material of the layer 22. It is to be noted that the plug portion 39 is particularly adapted to project through the dispensing opening 16 in spaced relation thereto for effecting a controlled flowing of the plastics material of the layer 22.

The tab 18 is carried by an anvil 42. The anvil 42 has formed therein vacuum passages 44 which communicate with a rib groove 36a and is also of an outline corresponding to that of the rib 34 (which is formed by drawing a vacuum against the top of the tab) so that the rib 34 may be intimately seated and drawn into the vacuum groove 36a for effecting intimate contact of the metal part 20 with the metal anvil. The heat in the anvil is transmitted through metal part 20 to the plastic 22 preparatory to application of the tape against the adhesive 45 to the outer side 47 of the end panel 14.

The anvil 42 is provided with a heating element 46. It is to be understood that the anvil 42 and the shell support 38 are forcefully urged together so as to effect a pressure flowing of the plastics material 22 of the tab along the end panel so that a prescribed portion of the plastics material will flow through the dispensing opening 16 around the plug portion 39 and then radially outwardly to define a flange on the underside of the shell. Thus, the plastics material of the layer 22 defines a ring 48 which lines the dispensing opening 16 and a flange 50 which underlies and is bonded to the undersurface of the shell 14. As is best shown in FIG. 5, the shell 10 preferably has a thin coating of the adhesive plastics material on each of the surfaces thereof, the coating being identified by the numeral 45 so as to facilitate the bonding under pressure and heat conditions of the plastics material of the layer 22 to the upper surface of the container panel 14 and to the undersurface.

As outlined above, the formation of the rib on the tab in conjunction with a vacuum groove of a like cross section and outline on the anvil serves three functions:

(1) The rib and vacuum groove ensure intimate contact of the tab with the anvil. This intimate contact provides maximum heating of the tab in the critical area around the dispensing opening, thus providing for the plastics material flow through the dispensing opening to form the protective flanges.

(2) The rib on the tab provides an improved bond between the tab and the container panel around the dispensing opening. In a finished packaged container, the tab and the protective flange are under stress due to internal pressure and bulging of the tab. The increased volume of plastics material under the rib provides a minimum flow area around the dispensing opening and essentially eliminates or minimizes shear flow of the plastic along the interfaces 51, 47. Improved bonding occurs.

(3) The rib material in being drawn into the rib groove reorients the plastic material in the rib and thus essentially eliminates fracture of the plastics material layer in the rib and separation from the end panel around the dispensing opening. The additional thickness of plastics material in alignment with the rib ensures that the plastics material will break along the inside flange 48 of the dispensing opening as opposed to separating from the metal foil layer 20.

As will be understood that when the tab 18 is displaced relative to the container panel 14 in the opening of the container, there will be a rupture of the plastics material of the flange 48 in the region identified as 57 assuring a complete opening of the container while at the same time retaining adherance to the container panel of the protective flange material.

Although only a preferred embodiment of the tab has been specifically illustrated and described herein, it is to be understood that minor variations may be made in the tab configuration without departing from the spirit and scope of the invention as defined by the appended claims.

I claim:

1. A method of forming a closure on a container wall having an external side and having a pour opening comprising:
   applying a peelable adhesive to the external side of said wall about the opening,
   placing a tape having a thermoplastic portion against the adhesive in covering relation to the opening,
   heating either the tape or wall or both before, during or after application of the tape to the wall to plasticize the thermoplastic portion of the tape, and
   pressing the wall and tape together to squeeze excess plasticized thermoplastic material from therebetween, by a tool having a rib-forming groove and directing the excess material into a confined area defined by the groove circumscribing the opening to form a reinforcing rib projecting outwardly from said external side, into which said excess thermoplastic material is caused to flow and thereby sealing the tape to the wall.

2. A method of forming a closure on a container having a wall with a pour opening defined by a peripheral edge comprising:
   providing a closure tape having a metal outer portion and a thermoplastic material inner portion,
   applying an adhesive between said inner portion and said wall to at least one thereof,
   heating at least one of said tape and wall to plasticize the thermoplastic material, pressing said tape against one side of the wall and simultaneously providing a relief area in the region of the opening in the tape to cause excess material to flow thereinto away from said wall circumjacent to said opening in a manner to minimize shearing stress on the material along its interface with said wall.

3. The invention according to claim 2 in which the relief area is formed by deforming the tape.

4. The invention according to claim 3 wherein said deformation is in the form of a rib circumscribing said opening.

5. The invention according claim 2 wherein said material is caused to flow into the opening in covering relation to said peripheral edge.

6. The invention according to claim 5 and wherein said material is caused to flow in underlapped relation to said wall and said wall is embraced by said material through said opening.

7. A method of bonding a tab to a container panel having a dispensing opening therethrough, said method comprising the steps of providing a pull tab of a laminated construction including a metal foil outer layer and a heat bondable plastics material inner layer, providing said outer layer with an upstanding rib of a size and outline to extend about said dispensing opening, providing an anvil for positioning and heating the tab including a vacuum groove of an outline and cross section corresponding to that of said rib, positioning the tab on the anvil, maintaining the tab on the anvil by applying a vacuum in the vacuum groove, heating said tab through the anvil thus plasticizing the plastic material and applying said tab to the container panel under pressure causing the plastics material to bond to the container panel and causing the excess material to flow into the groove and also through the dispensing opening to form a flange on the opposite surface of the container panel.

* * * * *